United States Patent [19]
Priem

[11] Patent Number: 4,956,802
[45] Date of Patent: Sep. 11, 1990

[54] METHOD AND APPARATUS FOR A PARALLEL CARRY GENERATION ADDER

[75] Inventor: Curtis Priem, Fremont, Calif.

[73] Assignee: Sun Microsystems, Inc., Mountain View, Calif.

[21] Appl. No.: 284,110

[22] Filed: Dec. 14, 1988

[51] Int. Cl.$^5$ .............................................. G06F 7/50
[52] U.S. Cl. ................................................ 364/787
[58] Field of Search ................ 364/784, 786, 787, 788

[56] References Cited

U.S. PATENT DOCUMENTS

| | | | |
|---|---|---|---|
| 3,202,806 | 8/1965 | Menne | 364/787 |
| 3,372,377 | 3/1968 | Cohn et al. | 364/787 |
| 4,441,158 | 4/1984 | Kanuma | 364/787 |
| 4,623,982 | 11/1986 | Ware | 364/788 |
| 4,761,760 | 8/1988 | Tomoji | 364/787 |

FOREIGN PATENT DOCUMENTS 2127187  3/1983  United Kingdom .

*Primary Examiner*—Gary V. Harkcom
*Assistant Examiner*—Long T. Nguyen
*Attorney, Agent, or Firm*—Blakely Sokoloff Taylor & Zafman

[57] ABSTRACT

The parallel carry generator calculates the carry for a m bit number within $\log_2 n + 1$ gate delays where n is smallest binary ordered number greater than or equal to m. Thus in the parallel carry generation adder of the present invention, the sum is calculated in $\log_2 n + 2$ gate delays. Thus, a 32 bit carry computation can be performed in as little as 6 gate delays. This is achieved by breaking down the 32 bit word according to binary ordered values and cascading portions of the calculations required wherein the carry generated for the most significant bit of the lower binary ordered group is used to calculate the carrys for the bits in next higher ordered group. By ordering the bits and the logic circuitry in this manner, the amount of gate delays to perform the carry calculation is minimized without excessively increasing the amount of logic.

6 Claims, 5 Drawing Sheets

C 0 = Cl

C 1 = AND 0+               (30)
    OR 0 • Cl              (31)

C 2 = AND 1+               (32)
    OR 1 • AND 0+       (33)
    OR 1 • OR 0 • Cl    (34)
                         (35)

C 3 = AND 2+
    OR 2 • AND 1+
    OR 2 • OR 1 • AND 0+
    OR 2 • OR 1 • OR 0 • Cl    (36)

C 4 = AND 3+
    OR 3 • AND 2+
    OR 3 • OR 2 • AND 1+
    OR 3 • OR 2 • OR 1 • AND 0+
    OR 3 • OR 2 • OR 1 • OR 0 • Cl    (38)

C 5 = AND 4+
    OR 4 • AND 3+
    OR 4 • OR 3 • AND 2+
    OR 4 • OR 3 • OR 2 • AND 1+
    OR 4 • OR 3 • OR 2 • OR 1 • AND 0+
    OR 4 • OR 3 • OR 2 • OR 1 • OR 0 • Cl    (40)

C 6 = AND 5+
    OR 5 • AND 4+
    OR 5 • OR 4 • AND 3+
    OR 5 • OR 4 • OR 3 • AND 2+
    OR 5 • OR 4 • OR 3 • OR 2 • AND 1+    (42)
    OR 5 • OR 4 • OR 3 • OR 2 • OR 1 • AND 0+
    OR 5 • OR 4 • OR 3 • OR 2 • OR 1 • OR 0 • Cl

C 7 = AND 6+FIG. FIGURE #
    OR 6 • AND 5+
    OR 6 • OR 5 • AND 4+
    OR 6 • OR 5 • OR 4 • AND 3+
    OR 6 • OR 5 • OR 4 • OR 3 • AND 2+    (44)
    OR 6 • OR 5 • OR 4 • OR 3 • OR 2 • AND 1+
    OR 6 • OR 5 • OR 4 • OR 3 • OR 2 • OR 1 • AND 0+
    OR 6 • OR 5 • OR 4 • OR 3 • OR 2 • OR 1 • OR 0 • Cl

FIG. 1

Input from Lower Order Group
(1) $C_{0,7} = (C_{0,3} \cdot OR_{4,7}) + C_{4,7}$ — 4 Gate Delays (2) $C_{0,3} = (C_{0,1} \cdot OR_{2,3}) + C_{2,3}$ — 3 Gate Delays (3) $C_{0,1} = (C_{0,0} \cdot OR_{1,1}) + C_{1,1}$
$= CI \cdot (A_0 + B_0) + (A_0 \cdot B_0)$ (4) $OR_{4,7} = (OR_{4,5} \cdot OR_{6,7})$ — 3 Gate Delays (5) $OR_{4,5} = (OR_{4,4} \cdot OR_{55}) = (A_3 + B_3) \cdot (A_4 + B_4)$ — 2 Gate Delays (6) $OR_{6,7} = (OR_{6,6} \cdot OR_{77}) = (A_5 + B_5) \cdot (A_6 + B_6)$ — 2 Gate Delays (7) $C_{4,7} = (C_{4,5} \cdot OR_{6,7}) + C_{6,7}$ — 3 Gate Delays (8) $C_{4,5} = (C_{4,4} \cdot OR_{5,5}) + C_{5,5}$
$= ((A_3 \cdot B_3) \cdot (A_4 + B_4)) + (A_4 \cdot B_4)$ — 2 Gate Delays (9) $OR_{6,7} = OR_{6,6} \cdot OR_{7,7}$
$= (A_5 + B_5) \cdot (A_6 + B_6)$ — 2 Gate Delays

(10) $C_{6,7} = (C_{6,6} \cdot OR_{7,7}) + C_{7,7}$
$= ((A_5 \cdot B_5) \cdot (A_6 + B_6)) + (A_6 \cdot B_6)$ — 2 Gate Delays

FIG. 4

METHOD AND APPARATUS FOR A PARALLEL CARRY GENERATION ADDER

BACKGROUND OF THE INVENTION

1. Field of the Invention

This invention relates to method and apparatus for generating the carry bits for the sum of two multi-bit inputs. More particularly this invention relates to a digital integrated circuit which generates the carry output within a minimum number of gate delays.

2. Art Background

Digital integrated circuitry, such as ripple carry adders and select carry adders, that performs the binary addition of two input values are well known and widely used. Each bit of the result is calculated from the sum of the corresponding two input bits and the carry-in, which is the carry generated from the sum of adjacent less significant bits and its carry-in. However, as the speed of the computers increase so does the need to increase the speed of all the digital circuitry utilized in or with the computer. This need is particularly evident in systems which employ 32 and 64 bit words. Ripple carry adders require upwards of 64 gate delays for a 32 bit adder because the processing of the more significant bits is dependent on the results of the processing of the lesser significant bits. For example, the sum of bit N is dependent upon whether there was a carry generated by the sum calculated for bit $N-1$. Similarly, the sum of bits $N-1$ is dependent upon the carry generated from the sum of bits $N-2$. Thus, the calculation of the more significant bits must be delayed until the carrys of the less significant bits are calculated. There are circuits that improve upon the number of gate delays. For example, in U.S. Pat. No. 4,682,303, a carry select adder is described in which, for example in a 32 bit case, the low 16 bits are summed and two sets of the upper 16 bits are calculated, the first group having a carry in signal of zero and the second group having a carry in signal of one wherein the output generated during the carry out generated due to the calculation of the lower 16 bits determines which result to choose. The '303 patent further optimizes this concept by breaking down the size of the 16 bit groups further into three sets of 8 adders. The patent describes circuitry in which the gate delays are decreased to 18 stages for a 32 bit computation. However, this method requires extensive and complex circuitry and 18 gate delays is a still an undesirable number of delays. U.S. Pat. No. 4,764,886, discloses a bit slice adder. The adder disclosed is similar to a ripple carry adder but two calculations are performed in parallel for each of the individual bits—the case where the carry-in has a value of zero and the case where the carry-in has a value of one. The output is multiplexed with the actual carry in bit selecting the output value. Although this method further decreases the time required for a 32 bit calculation, the adder still requires at least a significant number of gate delays to perform the calculation.

SUMMARY OF THE INVENTION

It is therefore an object of the present invention to provide a parallel carry generator in which the calculation of the carry bits may be performed in a minimal number of gate delays without severely increasing the amount of logic circuitry required.

It is further an object of the present invention to provide a parallel carry generator which may be used with such arithmetic circuits, such as adders, subtracters and comparators.

The parallel carry generator of the present invention calculates the carry for a m bit number within $\log_2 n + 1$ gate delays where n is smallest binary ordered number greater than or equal to m. Thus in the parallel carry generation adder of the present invention, the sum is calculated in $\log_2 n + 2$ gate delays and with respect to a 32 bit addition, the process can be performed in as little as 7 gate delays. This is achieved by breaking down the 32 bit word according to binary ordered values and cascading portions of the calculations required wherein the carry generated for the most significant bit of the lower binary ordered group is used to calculate the carrys for the bits in next higher ordered group By ordering the bits and the logic circuitry in this manner, the amount of gate delays to perform the carry calculation is minimized without excessively increasing the amount of logic.

The logic required to construct the parallel carry generator of the present invention may be characterized by the following recursive equation wherein the carry-out ("C") is generated for two words, A and B.

$$C_{m,n} = (C_{m,m+p-1} \cdot OR_{m+p,n}) + C_{m+p,n}$$

where:
if m=n, then $C_{m,n} = (A_{m-1} * B_{m-1})$;
if m=n=0, then $C_{0,0}$=Carry-in (CI) to the circuit;
p=the largest binary number (e.g. 1, 2, 4, 8, 16, 32 . . . ) Less than or equal to $n-m$
$C_{m,m+p-1}$ is the carry-out generated by the most significant bit of the lower ordered group which does not have to be recomputed by the higher ordered group of bits;
$C_{m+p,n}$ represents the carry-out bit generated from the individual addition of bits $A_{m+p-1}$ through $A_{n-1}$ and $B_{m+p-1}$ to $B_{n-1}$;
"+" is the logical OR operator and "*" represents the logical AND operator;
$OR_{m+p,n}$ represents the logical AND function of the individual logical OR of bits $A_{m+p-1}$ and $B_{m+p-1}$ through $A_{n-1}$ and $B_{n-1}$ and is represented by the following equation:

$$OR_{i,j} = OR_{i,i+k-1} * OR_{i+k,j}$$

where:
if i=j, then $OR_{i,j} = A_{i-1} + B_{i-1}$; and
k=the largest binary number less than or equal to $j-i$.

Using the above equations as a guideline for organizing the cascading blocks of circuits, the carry bits for a 32 bit word can be generated in as little as 6 gate delays.

Similarly, parallel carry generation adder circuit utilizing the parallel carry generator of the present invention may be characterized by the following equation:

$$Out_q = (A_q \, XOR \, B_q) XOR \, C_{0,q}$$

where XOR represents the exclusive OR function using the parallel carry generation adder circuit, the calculation of the sum of 32 bit words can be calculated in as little as 7 gate delays.

BRIEF DESCRIPTION OF THE DRAWINGS

The objects, features and advantages of the parallel carry generator of the present invention will be apparent from the following detailed description of the preferred embodiment in which:

FIG. 1 illustrates logical equations to generate a carry.

FIG. 4 illustrates the logic calculation for Carry-out bit 7 representative of the embodiment illustrated in FIG. 2.

DETAILED DESCRIPTION OF THE INVENTION

Figure 2:
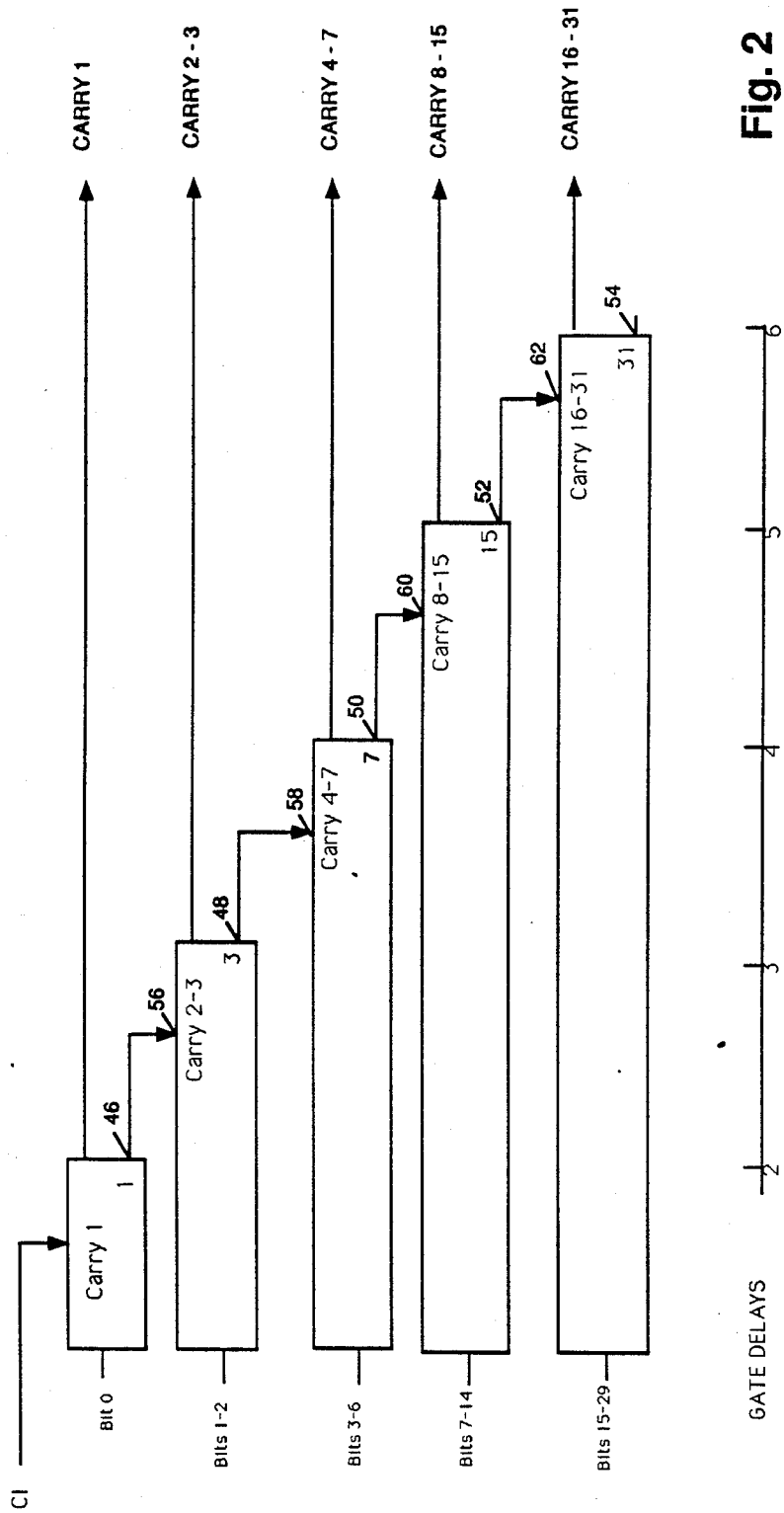
FIG. 2 is a block diagram showing the organization of the parallel carry generator of the present invention.

In the present description, the following conventions will be utilized to describe the parallel carry generator of the present invention: the carry-out bit "n" refers to the carry generated from the inputs $A_{n-1}$ and $B_{n-1}$ and carry-out bit 0 is equal to the carry-in to the circuit.

The calculation of the carry bits which are typically utilized in adder circuits, subtracter circuits and comparator circuits may be thought of in terms of the logical equations illustrated in FIG. 1. For example, the carry-out bit 0 ($C_0$) is equal to the CI. The carry-out derived from input bits $A_0$ and $B_0$ which is considered to be and will hereinafter be referred to as the carry-out bit 1 ($C_1$), may be thought of, referring to line 30, as the logical AND of bit 0 of the first input A and bit 0 of the second input B (hereinafter referred to as AND 0) logically ORed with the logical OR of bits 0 of the A input and bit 0 of the B input ("OR0") logically ANDed with the carry-in bit to the circuit (see line 31). Similarly, the carry-out bit 2 may be thought of as the logical AND of bits 1 (see 32) ORed with the logical OR of bits 1 ANDed with the logical AND of bits 0 (see 33) ORed with the logical OR of bits 1 ANDED with the logical OR of bits 0 ANDED with the carry-in to the circuit (see 34). Further examination of the logical equations for the carry-out for bits 2-5 illustrated in FIG. 1 set forth a pattern in the calculation of the carry out bits which the parallel carry generator of the present invention takes advantage of. The equations for determining the carry out bits of the more significant bits incorporate the equations for determining the carry-out bits for the lesser significant bits. For example, it can be seen that the logic for determining carry-out bit 1 is incorporated into the logic for the carry-out bit 2. Similarly the logic to determine the carry-out bit 3 incorporates the logic from carry-out bit 2.

In the parallel carry generator of the present invention, the logic circuitry required to calculate the carry-out bits is organized such that the bits are grouped in ascending binary order. That is, the bits are grouped according to the following equation: $2^n$ to $2^{n+1}-1$, where n=0, 1, 2, 3, 4, 5 etc. For example, carry-out bit 1 ($2^0=1$) is the first group, carry-out bits 2-3 ($2^1=2$) is the second followed by carry-out bits 4-7 ($2^2=4$), carry-out bits 8-15 ($2^3=8$), carry-out bits 16-31 ($2^4=16$) etc. As illustrated in FIG. 2, the carry-out signals 46, 48, 50, 52, 54 generated from the most significant bits of the lower ordered group are utilized as the carry in signals 56, 58, 60, 62 to the corresponding higher ordered groups, eliminating the need to calculate the portion of the logical equation corresponding to the lower order bits. This is further illustrated in FIG. 1. The logic for the calculation of carry 1 may be incorporated into the logic for the calculation of carry-out bits 2 and 3 and thereby eliminating the need to repeat the identical calculation (represented by triangles 35 and 36). Similarly the logic for the calculation of carry-out bit 3 is incorporated into the logic for the calculation of carry-out bits 4-7 and replaces the calculations within triangles 38, 40, 42, 44.

Thus, a minimal amount of logic is required to complete the logical equation for the generation of the carry-out bits within the group and this logic is calculated during the same time period the lower order carry bits are calculated. In addition, the carry-out bits for each of the higher order group of bits is calculated within one additional gate delay of the lower order group of carry-out bits. The one additional gate delay is utilized to logically combine the most significant carry-out bit from the lower ordered group with logic generated in the higher ordered group. It is preferable that the logic circuitry within each group of bits be organized to minimize the amount of logic circuity required within each group to generate the required logic.

The logic required to construct the parallel carry generator of the present invention may be characterized by the following equation wherein the carry-out (C) is generated for two words, A and B.

$$C_{m,n} = (C_{m,m+p-1} \cdot OR_{m+p,n}) + C_{m+p,n}$$

where:
if m=n, then $C_{m,n}=(A_{m-1}*B_{m-1})$;
if m=n=0, then $C_{0,0}$=Carry-in (CI) to the circuit;
p=the largest binary number (e.g. 1, 2, 4, 8, 16, 32 . . . ), less than or equal to n−m;
$C_{m,m+p-1}$ is the carry-out generated by the most significant bit of the lower ordered group which does not have to be recomputed by the higher ordered group of bits;
$C_{m+p,n}$ represents the carry-out bit generated from the individual addition of bits $A_{m+p-1}$ through $A_{n-1}$ and $B_{m+p-1}$ through $B_{n-1}$;
"+" is the logical OR operator and "*" represents the logical AND operator;
$OR_{m+p,n}$ represents the logical AND function of the individual logical OR of bits $A_{m+p-1}$ and $B_{m+p-1}$ through $A_{n-1}$ and $B_{n-1}$ and is represented by the following equation:

$$OR_{i,j} = OR_{i,i+k-1} * OR_{i+k,j}$$

where:
if i=j, then $OR_{i,j}=A_{i-1}+B_{i-1}$; and
k=the largest binary number less than or equal to j−i.

Figure 3:
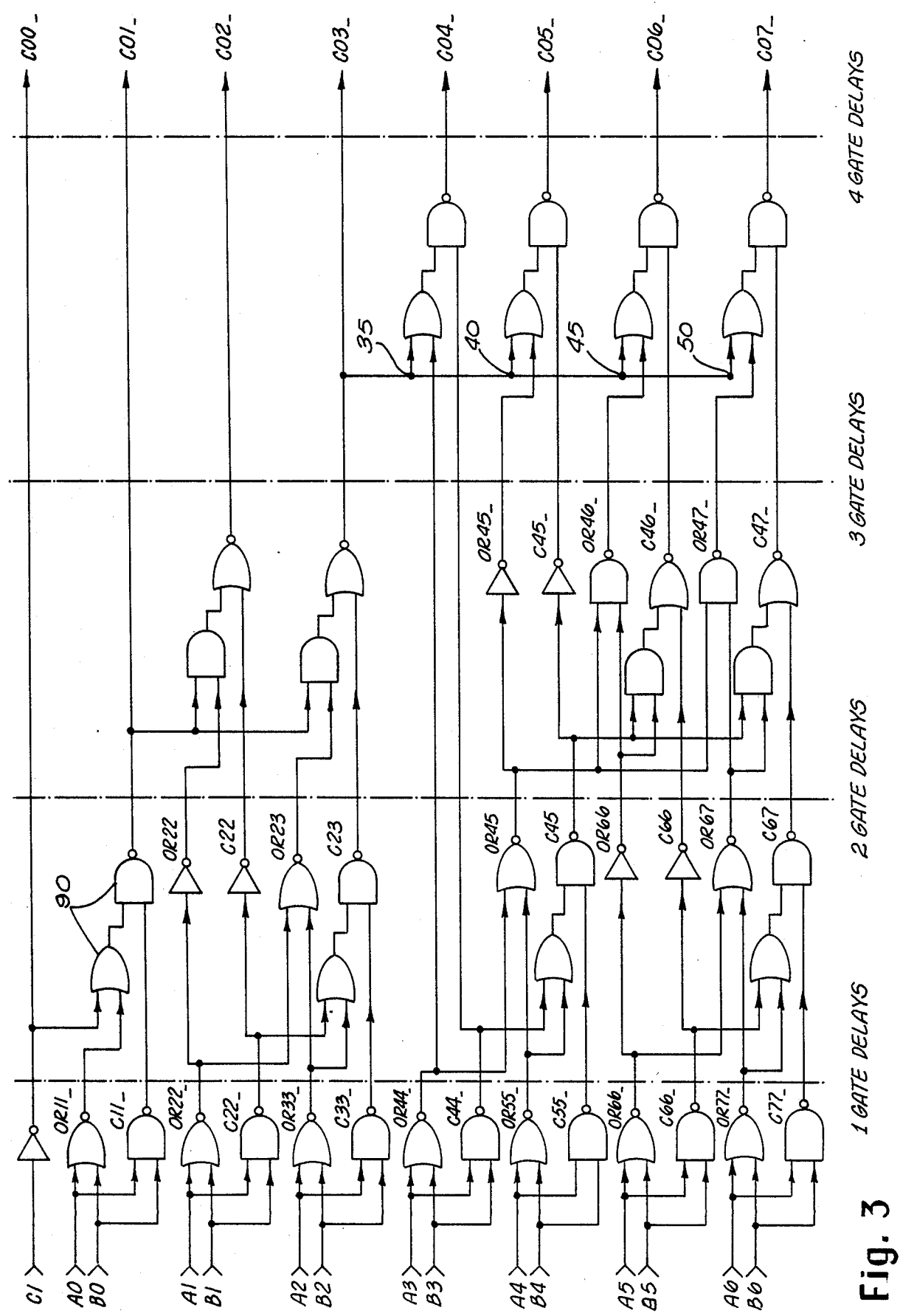
FIG. 3 illustrates an embodiment of the circuitry of the parallel carry generator of the present invention.

FIG. 3 is illustrative of an embodiment of the parallel carry generator of the present invention. The circuit shown generates carry-out bits 0-7 (carry-out bit 0 is the carry-in bit to the circuit). As can be seen from the circuit, the total number of gate delays to generate the carry-out bits is equal to four. In the technology used in this embodiment, the AND/OR pair, for example the AND/OR Pair identified as 90 in FIG. 3 is comparable to one gate delay. In order to clarify the correspondence between the circuit and the above equations which represent the circuit, the output of the gates have been labeled to indicate logically what the signal represents at the output of the gate. For example, "OR11" is representative or $OR_{1,1}$ and C45 is representative of $Carry_{4,5}$. It should be evident that this physical representation of the circuit is only one way of implementing the logical organization described using the above equations. It will be obvious to one skilled in the art from reading this description that, depending upon the technology (e.g., CMOS, bipolar, ECL etc.) used, the circuit may be implemented using a different organization of logic gates which still follows the above logic organization herein described.

FIG. 4 illustrates the representative logic calculations for Carry-out bit 7 ($C_{0,7}$) with the corresponding number of gate delays required to compute each equation. As set forth in FIG. 4, equation 1, Carry-out bit 7 is equal to the Carry-out bit 3 ANDed with ORed bits 4 to 7, ORed with the Carry-outs of bits 4–7. Carry-out bit 3 ($C_{0,3}$), is calculated in the lower ordered group and is input, at locations 30, 35, 40 and 45 to calculate the higher ordered group (bits 4–7). OR 4, 7 is calculated within 3 gate delays and with the minimum number of logic gates by further breaking the function down to equations 4–6, FIG. 4. The third element of equation 1, $Carry_{4,7}$ is simplified and broken down into the representative equations 7–10.

The computational elements ($C_{0,3}$, $OR_{4,7}$, $C_{4,7}$), are executed in parallel whereby the calculation requires only one gate delay more than is needed to calculate the carry-out bits of the next lower ordered bits (i.e., Carry-out bits 2 and 3) In addition, the number of logic gates are not excessive, thereby optimizing the amount of space required to implement the circuit and increasing the speed of the circuit by decreasing the amount of interconnect between gates.

The parallel carry generator can be easily expanded to any number of bits following the guidelines set forth in the above logic equations as illustrated in the circuit of FIG. 3. Thus, the carry out generator of the present invention can be expanded to 32 bits, the circuit having six levels of gate delays or to 64 bits, the circuit having seven levels of gate delays.

Figure 5:
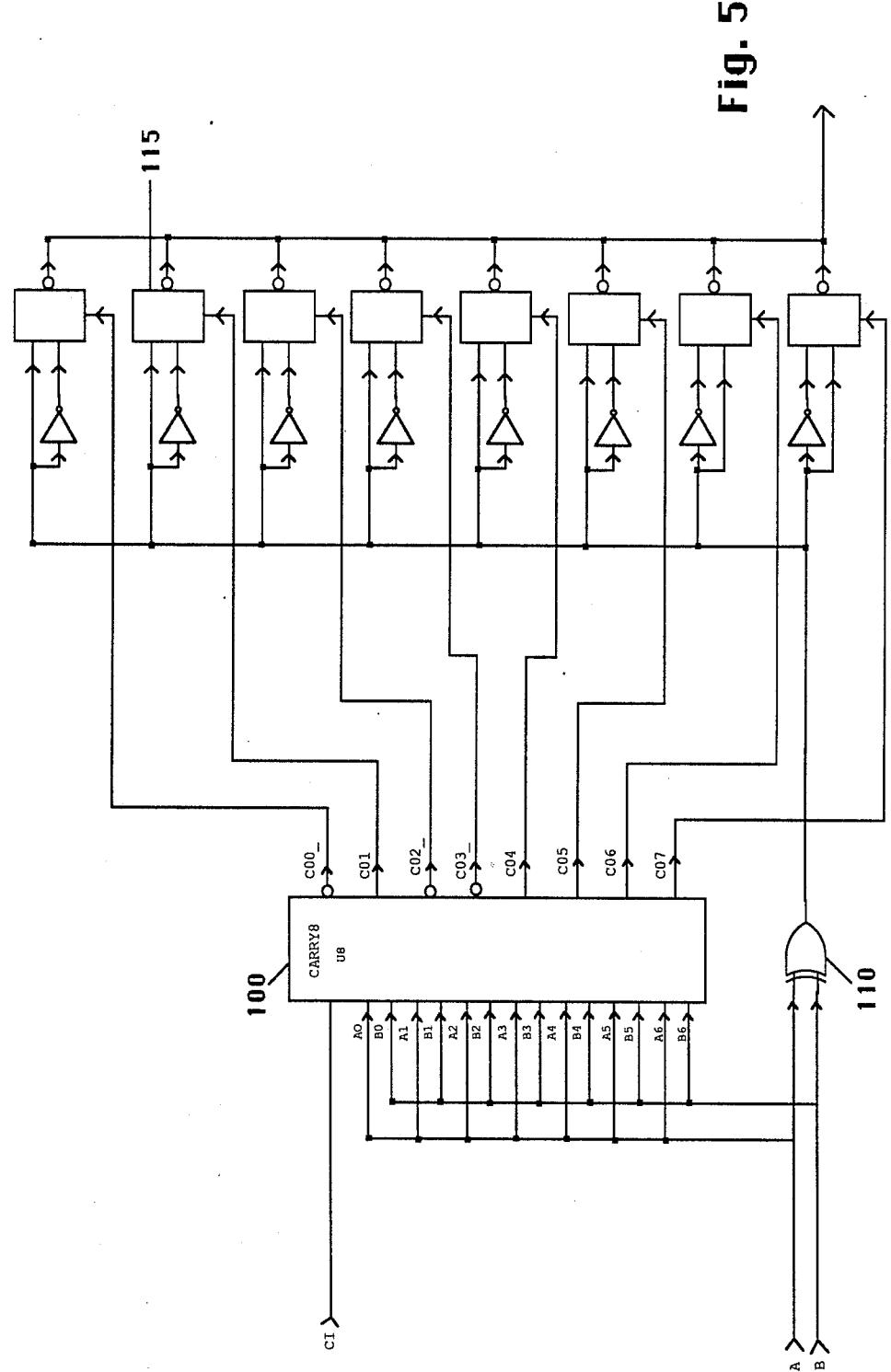
FIG. 5 is an parallel carry generation adder circuit incorporating the parallel carry generator of the present invention.

The carry-out bits generated using the parallel carry generator of the present invention may be utilized for the calculation of a multiplicity of functions such as the adder circuit depicted in FIG. 5. In the adder circuit, the parallel carry generator 100 has bit inputs $A_0$–$A_6$, $B_0$–$B_6$, CI (carry-in) and outputs Carry-out bits 0 to 7. Bits 0–7 of inputs A and B are individually XORed together using the EXCLUSIVE OR function represented by XOR 110 in FIG. 5. The result of the XOR of the individual bits is one input to a multiplexer (MUX). The result of the XOR of the bits is also inverted to become the second input to the multiplexer. The Carry-out bits are used as the select signal to each of the multiplexers. For example with respect to the addition of bit 1, the first input to the inverted-output MUX 115 is equal to the inverted output of the exclusive OR of $A_1$ and $B_1$. The second input to the MUX 115 is equal to the output the exclusive OR of $A_1$ and $B_1$. The Carry-out bit 0 selects the output of the MUX 115. Thus if the carry-out bit 1 is equal to zero, the first input, inverted, is the output of the MUX, and if the carry-out bit is equal to one, the second input, is selected to be output through the inverted output of the MUX 115. The MUX is replaces an additional XOR function that is typically used in Adder circuits. The MUX advantageous over the XOR function because it requires only a single gate delay to execute, as opposed to the two gate delays required to execute the XOR function. Thus this 8 bit adder circuit requires only 5 gate delays to execute.

It is evident to one skilled in the art from reading the present description that the parallel carry generator of the present invention may be used in other arithmetic-based circuits including subtracters, multipliers, comparators, incrementor and decrementor circuits.

While the invention has been described in conjunction with the preferred embodiment, it is evident that numerous alternative, modifications, variations and uses will be apparent to those skilled in the art in light of the foregoing description.

What is claimed is:

1. A circuit to generate carry-out bits of a multi-bit sum of a first multi-bit input and second multi-bit input wherein each bit sum is derived from a bit from the first input, a bit from the second input, and a carry-in bit, said circuit comprising:
   a first sub-circuit comprising components to compute a least significant carry-out bit, said least significant carry-out bit being equal to a carry-in bit to the circuit;
   at least one second sub-circuit coupled to said first sub-circuit to compute carry-out bits more significant than the least significant carry-out bit, each of said second sub-circuits being organized according to binary ordered groups of input bits wherein a binary-ordered group is determined according to the equation $group_n =$ input bits ($2^n$) through input bits ($2^{n+1} - 1$), the number of said second sub-circuits being equal to the number of binary groups, each of said second sub-circuits being organized in a less significant to more significant order and comprising:
   a carry-in bit to the second sub-circuit of a group, the value of the carry-in bit being the value of the carry-out bit computed by an adjacent less significant second sub-circuit;
   a first group of components to compute a preliminary carry-out bit for the respective input bits, said first group of components organized to compute approximately concurrent with the components of said adjacent less significant second sub-circuit which computes the carry-in bit to the second sub-circuit, the number of gate delays required for the first group of components to compute being less than or equal to the number of gate delays required for the components of the less significant second sub-circuit to compute the carry-in bit; and
   a second group of components coupled to the first group of components to compute the carry-out bit for the respective group of the input bits as the combination of the carry-in bit and the output of the first group of components, said output being equal to said preliminary carry out bit, said second group of components computing the carry-out bit in one gate delay;
   wherein said second sub-circuit, to compute the carry-out bit for the respective input bits for the binary-ordered group, utilizes one gate delay more than the number of gate delays utilized to generate the carry-in bit to the second sub-circuit.

2. The circuit of claim 1 further comprising a third sub-circuit comprising components to calculate the multi-bit sum of the first multi-bit input and second multi-bit input, said third sub-circuit comprising:
   components representative of logic of a first EXCLUSIVE OR function to EXCLUSIVE OR a bit from the first input and a bit from the second input; and components representative of logic of a second EXCLUSIVE OR function to EXCLUSIVE OR the output from the components representative of the logic of the first EXCLUSIVE OR function and the corresponding carry-out bit generated.

3. The circuit of claim 2 wherein said components representative of logic of said second EXCLUSIVE OR function comprises:
a multiplexor, the output of the components representative of logic of the first EXCLUSIVE OR function input to a first input of the multiplexor and the output of the components representative of logic of the first EXCLUSIVE OR function, inverted, input to a second input of the multiplexor, a carry-out bit generated corresponding to an input bit connected to a select input of the multiplexor which controls which input is the output from the multiplexor such that if the carry-out bit is not set, the first input to the multiplexor is the output from the multiplexor and if the carry-out bit is set, the second input of the multiplexor is the output from the multiplexor.

4. A circuit to compute carry-out bits (C) from the sum of a first multi-bit input ($A_{m,n}$) and second multi-bit input ($B_{m,n}$), wherein m, n represent a range of bits, m representing a least significant bit of the multi-bit input and n representing a most significant bit, of the multi-bit input, wherein the sum is computed from a bit from the first input, a bit from the second input, and a carry-in bit, said circuit comprising:
a first sub-circuit to compute the least significant carry-out bit ($C_{0,0}$), said least significant carry-out bit being equal to a carry-in bit to the circuit;
at least one second sub-circuit comprising a plurality of AND gates and OR gates ("the components") to compute carry-out bits, $C_{1,n}$, more significant than the least significant carry-out bit, each of the more significant carry-out bits computed from a bit from the first input, a bit from the second input, and a carry-in bit, said at least one second sub-circuit organized according to binary ordered groups of input bits wherein a binary-ordered group is determined according to the equation $group_n = $ input bits ($2^n$) through input bits ($2^{n+1} - 1$), the components being organized so as to compute the following recursive logic equation:

$$C_{m,n} = (C_{m,m+p-1} \cdot OR_{m+p,n}) + C_{m+p,n}$$

the components being organized in a manner so as to compute the three components of the equation $C_{m,m+p-1}$, $OR_{m+p,n}$, and $C_{m+p,n}$ approximately in parallel and a minimum number of gate delays are required to compute the values of the three elements, and where:
$C_{m,m+p-1}$ represents the value of the carry-out bit generated by the most significant bit of the adjacent lower binary-ordered group of bits;

$C_{m+p,n}$ represents the value of the carry-out bit generated from the bit sum of bits $A_{m+p-1}$ through $A_{n-1}$ and $B_{m+p-1}$ to $B_{n-1}$;
$OR_{m+p,n}$ represents the value generated from the execution of the AND function having as input values the values generated form the execution of the OR function, said OR function having as input values the bits of the first multi-bit input and the second multi-bit input, $A_{m+p-1}$ and $B_{m+p-1}$ through $A_{n-1}$ and $B_{n-1}$, whereby the componets to compute $OR_{m+p,n}$ are represented by the equation:

$$OR_{i,j} = OR_{i,i+k-1} * OR_{i+k,j}$$

where:
k = the largest binary number less than or equal to $j - i$; and if $i = j$, then $OR_{i,j} = A_{i-1}(+)B_{i-1}$;
p = the largest binary number (e.g. 1, 2, 4, 8, 16, 32 . . . ) less than or equal to $n - m$;
the symbol "(+)" represents components which execute the logical OR operation and "*" represents components which execute the logical AND operation;
wherein the number of gate delays required for the components to compute the carry-out bits for a binary-ordered group being one gate delay more than that required to generate the carry-out bits of the lower, adjacent, binary-ordered group.

5. The circuit of claim 4 further comprising a third sub-circuit comprising components to calculate the multi-bit sum of the first multi-bit input and second multi-bit input, said third sub-circuit comprising:
components representative of logic of a first EXCLUSIVE OR function to EXCLUSIVE OR a bit from the first input and a bit from the second input; and
components representative of logic of a second EXCLUSIVE OR function to EXCLUSIVE OR the output from the components representative of the logic of the first EXCLUSIVE OR function and the corresponding carry-out bit generated.

6. The circuit of claim 5 wherein said components representative of logic of said second EXCLUSIVE OR function comprises:
a multiplexor, the output of the components representative of logic of the first EXCLUSIVE OR function input to a first input of the multiplexor and the output of the components representative of logic of the first EXCLUSIVE OR function, inverted, input to a second input of the multiplexor, a carry-out bit generated corresponding to an input bit connected to a select input of the multiplexor which controls which input is the output from the multiplexor such that if the carry-out bit is not set, the first input to the multiplexor is the output from the multiplexor and if the carry-out bit is set, the second input of the multiplexor is the output from the multiplexor.

* * * * *